(12) United States Patent  (10) Patent No.: US 8,837,558 B1
Rao et al.  (45) Date of Patent: Sep. 16, 2014

(54) SYSTEMS, METHODS, AND DEVICES FOR IMPROVING SIGNAL DETECTION IN COMMUNICATION SYSTEMS

(71) Applicant: Motorola Solutions, Inc., Schaumburg, IL (US)

(72) Inventors: Yadunandana N. Rao, Sunrise, FL (US); RaviTeja Chinta, Sunrise, FL (US); Daniel A. Tealdi, Plantation, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 28 days.

(21) Appl. No.: 13/834,618

(22) Filed: Mar. 15, 2013

(51) Int. Cl.
*H04B 1/7093* (2011.01)

(52) U.S. Cl.
CPC .................................... *H04B 1/7093* (2013.01)
USPC ......................................................... 375/152

(58) Field of Classification Search
USPC ........................... 375/139, 143, 144, 148, 152
See application file for complete search history.

(56) References Cited

U.S. PATENT DOCUMENTS

| | | | |
|---|---|---|---|
| 5,210,772 A * | 5/1993 | Nakagawa | 375/139 |
| 6,603,803 B1 | 8/2003 | Hatch | |
| 6,968,194 B2 | 11/2005 | Ajadeff et al. | |
| 6,990,345 B2 | 1/2006 | Kuwahara et al. | |
| 8,169,369 B2 | 5/2012 | Gonzalez et al. | |
| 8,174,439 B2 | 5/2012 | Torimoto et al. | |
| 2007/0036353 A1* | 2/2007 | Reznik et al. | 380/30 |
| 2007/0142089 A1* | 6/2007 | Roy | 455/562.1 |
| 2009/0003134 A1* | 1/2009 | Nuttall et al. | 367/87 |
| 2009/0204362 A1 | 8/2009 | Park et al. | |
| 2009/0219210 A1 | 9/2009 | Caliri et al. | |

FOREIGN PATENT DOCUMENTS

WO 2011124959 A1 10/2011

* cited by examiner

*Primary Examiner* — Kevin Kim
(74) *Attorney, Agent, or Firm* — Steven A. May

(57) ABSTRACT

Systems, devices, and methods to improve signal detection of a receiver in communication systems, including receiving a signal having one or more distorted versions of a predetermined waveform as well as processing the received signal with a plurality of eigenfilters generated from eigenvectors of a covariance matrix of the predetermined waveform. Further a correlation output is generated by further processing the received signal with at least one matched filter formed from an eigenfiltered version of the predetermined waveform and identifying at least one peak in the correlator output. The peak may be used to improve performance of the receiver.

20 Claims, 16 Drawing Sheets

SYSTEMS, METHODS, AND DEVICES FOR IMPROVING SIGNAL DETECTION IN COMMUNICATION SYSTEMS

FIELD OF THE INVENTION

The field of the invention generally relates to improving signal quality in electronic devices. Particularly, the field of the invention relates to improving signal detection in communication systems across wireless networks.

BACKGROUND

Communication systems over wireless networks attempt to overcome the physical phenomena that decrease fidelity of a wireless communication signal. Such physical phenomena include attenuation of the communication signal over a long distance, the addition of noise and distortion, constructive and destructive interference, and multipath fading. Wireless communication receivers have been designed to overcome such affects of a wireless network using various techniques that include improving the signal processing of receivers to improve signal detection.

BRIEF DESCRIPTION OF THE SEVERAL VIEWS OF THE DRAWINGS

The accompanying drawings, which are incorporated in and constitute part of this specification, illustrate embodiments of the invention and together with the description serve to explain the principles of the present disclosure. The embodiments illustrated herein are presented as examples, it being understood, however, that the invention is not limited to the precise arrangements and instrumentalities shown, wherein.

DETAILED DESCRIPTION

Figure 1:
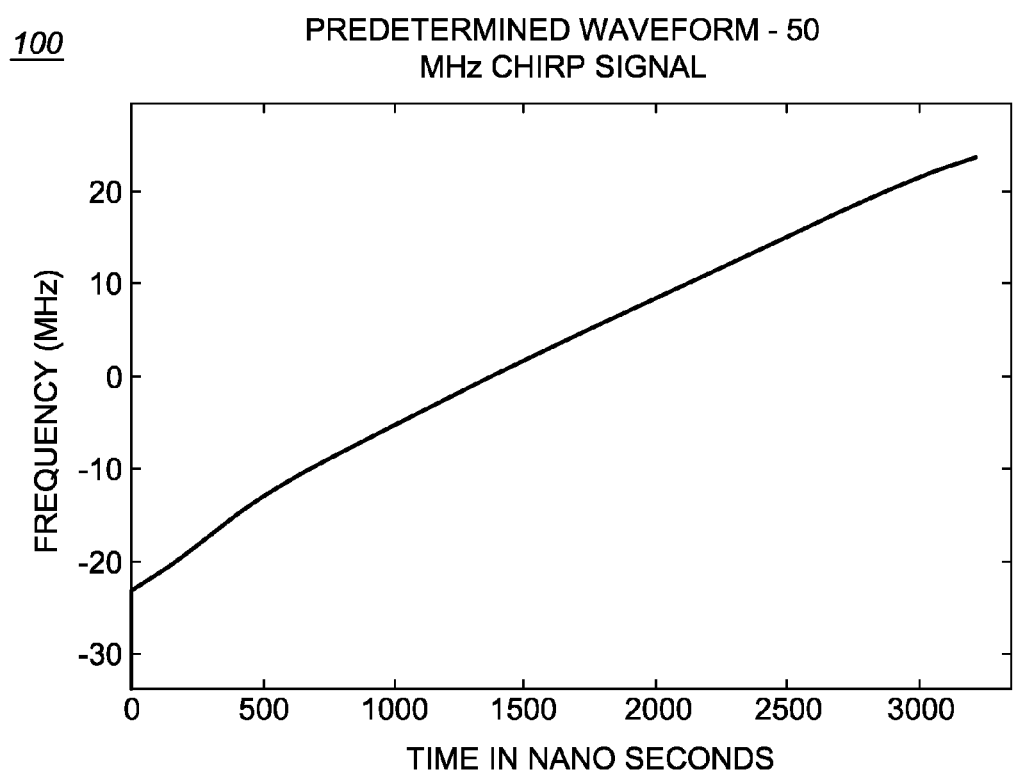
FIG. 1 is an example predetermined wideband waveform.

The illustrative embodiments described in the detailed description, drawings, and claims are not meant to be limiting. Other embodiments may be utilized, and other changes may be made, without departing from the subject matter presented herein. It will be readily understood that the aspects of the present disclosure, as generally described herein, and illustrated in the Figures, can be arranged, substituted, combined, separated, and designed in a wide variety of difference configurations, all of which are explicitly contemplated herein. Further, in the foregoing description, numerous details are set forth to further describe and explain one or more embodiments. These details include system configurations, block module diagrams, flowcharts (including transaction diagrams), and accompanying written description. While these details are helpful to explain one or more embodiments of the disclosure, those skilled in the art will understand that these specific details are not required in order to practice the embodiments.

Systems, devices and methods of the present disclosure improve signal detection in communication systems over a wireless network. The example systems, devices, and methods may be used in different embodiments that may include, but are not limited to, increasing the signal to noise ratio of a received signal to improve the performance of a receiver in a communication system. One embodiment may include estimating a range or distance between a transmitter and a receiver in a communication system. A further embodiment may include, but is not limited to, determining one or more multipath characteristics to be used in a multipath receiver (e.g., a rake receiver). Another embodiment may include, but is not limited to, increasing resolution of time delay characteristics of a received signal to improve timing synchronization between a transmitter and receiver of a communication system.

An embodiment used to estimate the range or distance between a transmitter and a receiver in a communication system may be performed in public safety applications. For example, in a fire and rescue scenario, a public safety commander (e.g., a fire chief, a police captain, etc.) located in a command center outside a building may require location and range information of rescue personnel that are traversing through the building to assess damage control and rescue operations. Each of the rescue personnel may have a transmitter that emits a "chirp" signal that is captured by one or more receivers located at or associated with the command center. In certain situations, there may be no line of sight between such transmitters and the receiver. Thus, the fidelity of the chirp signal may decrease due to physical phenomena such as attenuation due to intervening obstacles or structures, as well as the distance between the transmitter and the receiver and multipath fading.

Conventional receivers include a matched filter to detect such chirp signals. A matched filter is "matched" to a predetermined waveform. In this embodiment, the predetermined waveform may be a chirp signal. A matched filter is useful in detecting a predetermined waveform within a received signal that includes the predetermined waveform and additive white Gaussian noise (AWGN). The matched filter is based on a conjugated and time-reversed version of a sampled predetermined waveform. Further, the received signal is sampled and then processed with the matched filter. The filtering operation is identical to a correlation operation performed with the non-time reversed conjugate signal. Correlation is the sum of the products of a signal at each time index (i.e., a sliding dot product). When two signals are identical, the correlation is maximized because when the peaks of the two signals align, the product provides a positive contribution to the sum. Similarly, when troughs align, they also make a positive contribution to the sum. Generally, the signal to noise ratio of a matched filter output signal is maximized when a template of the transmitted signal is used to correlate against the received signal. Hence, the matched filter may be called a maximum likelihood detector.

However, a chirp signal used in range estimation between a transmitter and a receiver may result in one or more correlation peaks. A receiver having a matched filter used to detect such a chirp signal may be called Time of Arrival ("TOA") estimator that measures an arrival time of a predetermined signal based on a first peak of a correlator output signal to determine the range between a transmitter and the receiver. Even though the matched filter may be a maximum likelihood detector of the chirp signal over such public safety wireless networks, detection of the chirp signal alone does not resolve the ranging (e.g., distance between transmitter and receiver) errors due to multipath fading. In conventional matched filter based TOA estimator, multipath reflections cause multiple peaks in the matched filter output thereby increasing the location uncertainty. Typically, a chirp signal having a large bandwidth is required to be able to resolve the multiple peaks in the matched filter output. However, increasing bandwidth causes increased noise as well as interference, thereby reducing the range estimation between the transmitter and receiver.

Systems, devices and methods of the present disclosure describe a signal detection technique that incorporates intelligent pre-processing of the received signal that includes multiple distorted versions of the predetermined waveform or chirp signal together with noise. Such pre-processing is based on incorporating aspects of subspace signal decomposition into the matched filter based receiver. Subspace signal decomposition is based on the premise that any finite energy signal (e.g., a predetermined waveform or chirp signal) can be represented by a finite set of basis functions, wherein the number of basis functions is dependent on the spectral characteristics of the signal (e.g., a predetermined waveform or chirp signal). The number of basis functions can also be interpreted as the dimension or order of the signal. For example, white noise that is spectrally flat has infinite dimensions. Alternatively, a pure sinusoidal signal can be represented by amplitude and a phase component and hence has a dimensionality of two. Thus, in an application that has a signal buried in noise, the basis functions can be split into two sets, a first set that captures the signal characteristics and another set that captures the noise characteristics. The set of basis functions or basis vectors that capture the signal span the signal subspace, and the other set of basis vectors span the noise subspace.

Eigendecomposition is a method for extracting the signal and noise subspace from a discrete time sampled real or complex signal. For a given stochastic signal (such as a chirp signal plus noise), basis vectors can be extracted using the method of eigendecomposition of the sampled signal covariance matrix. Thus, the eigenvalues and eigenvectors associated with a covariance matrix of a sampled stochastic signal are given by the equation, $$Rv = \lambda v$$

The scalar quantity $\lambda$ is called an eigenvalue of the equation and the vector $v$ is an eigenvector of the covariance matrix R. The number of such eigenvectors is equal to the dimensionality of the matrix R. The eigenvectors of a covariance matrix with all distinct eigenvalues, being linearly independent, constitute a set of basis vectors for a space that is spanned by the signal. Further, for real signals, the eigenvectors may act as narrow band pass filters (e.g., eigenfilters) that sample the frequency spectrum. This specific property can be used in intelligent pre-processing of the chirp signal prior to receiving such a chirp signal using a matched filter receiver. The covariance matrix $R \in \Re^{M \times M}$ of a sampled chirp signal includes the chirp and noise plus interference (that is uncorrelated with the chirp) and is given by, $$R = \sum_{i=1}^{x} x(i)x(i)^T + \sum_{i=1}^{n} n(i)n(i)^T$$

$x(i) \in \Re^{M \times 1}$ and $n(i) \in \Re^{M \times 1}$ denote the signal vector and the noise vector respectively. A full eigendecomposition of the above matrix yields two square matrices, $V \in \Re^{M \times M}$ and $\Lambda \in \Re^{M \times M}$ such that, $$RV = V\Lambda$$

The columns of the matrix V are the eigenvectors and the diagonal elements of the matrix $\Lambda$ are the corresponding eigenvalues. Since, the covariance matrix comprises of both the chirp signal as well as the noise signal, by observing the magnitude of the eigenvalues, it is possible to split the eigenvector matrix into two parts, viz., $V = [V_x \mid V_n]$. The matrix of eigenvectors $V_x$ correspond to the chirp signal space and the matrix eigenvectors $V_n$ span the noise signal subspace with the two sets of vectors are still orthogonal to each other.

Figure 2:
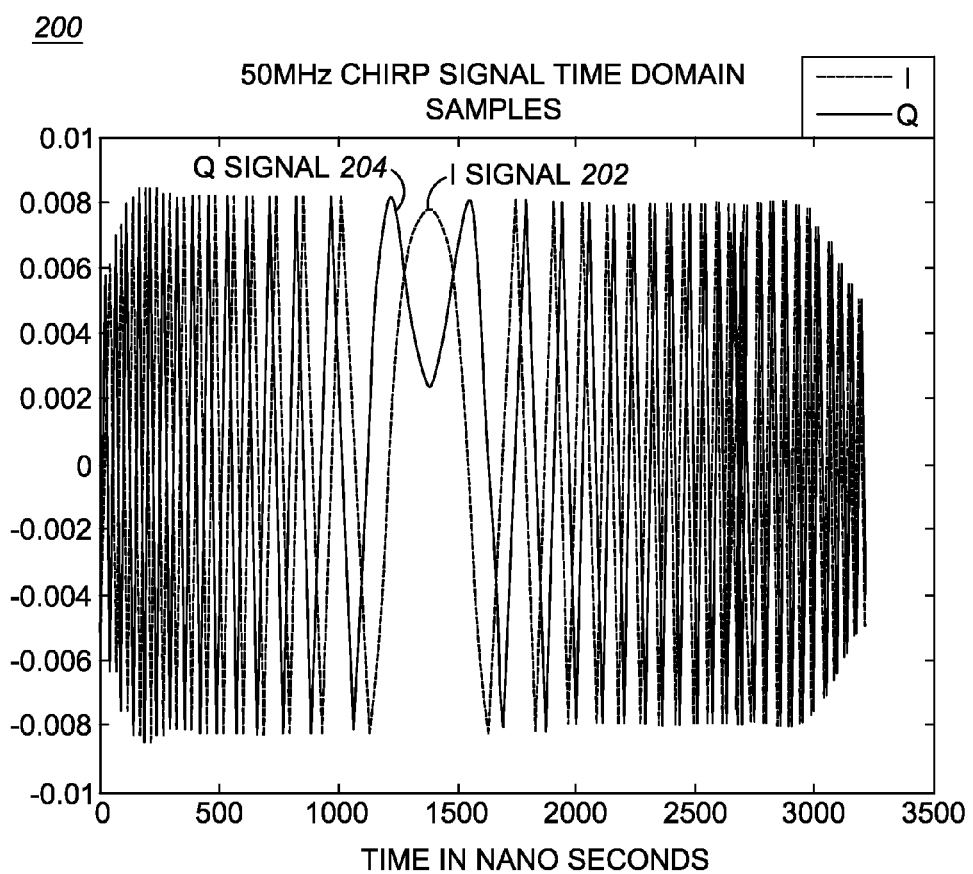
FIG. 2 shows the corresponding in-phase and quadrature (IQ) baseband signal of an example predetermined wideband waveform.
Figure 3:
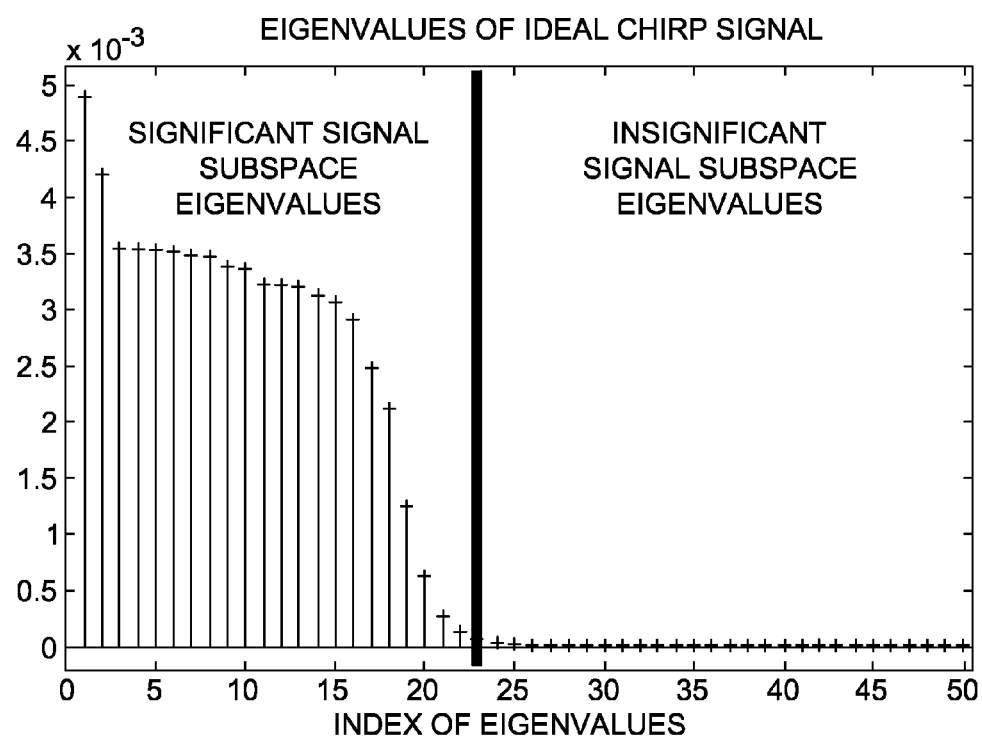
FIG. 3 shows the eigenvalues of the predetermined wideband waveform.

FIG. 1 is an example 50 MHz (e.g., wideband) chirp signal or predetermined waveform 100 and FIG. 2 is the corresponding in phase-quadrature (IQ) baseband signal (200, 202, and 204). Information content in both the real and imaginary parts are the same for chirp signal, thus, eigendecomposition of the real or the imaginary part need only be performed. FIG. 3 shows the eigenvalues 300 of the 2000×2000 covariance matrix.

Further, eigenvalues and eigenvectors may be computed over the covariance matrix of dimension 2000. The number of significant eigenvalues is shown to be about 22. The remaining eigenvalues capture the noisy perturbations in the predetermined waveform or chirp signal and are deemed to be insignificant. Based on such an index of eigenvalues, an eigenvector matrix can be split into two parts. The first 22 eigenvectors correspond to the significant signal space and the remaining corresponds to the insignificant signal space.

Figure 4:
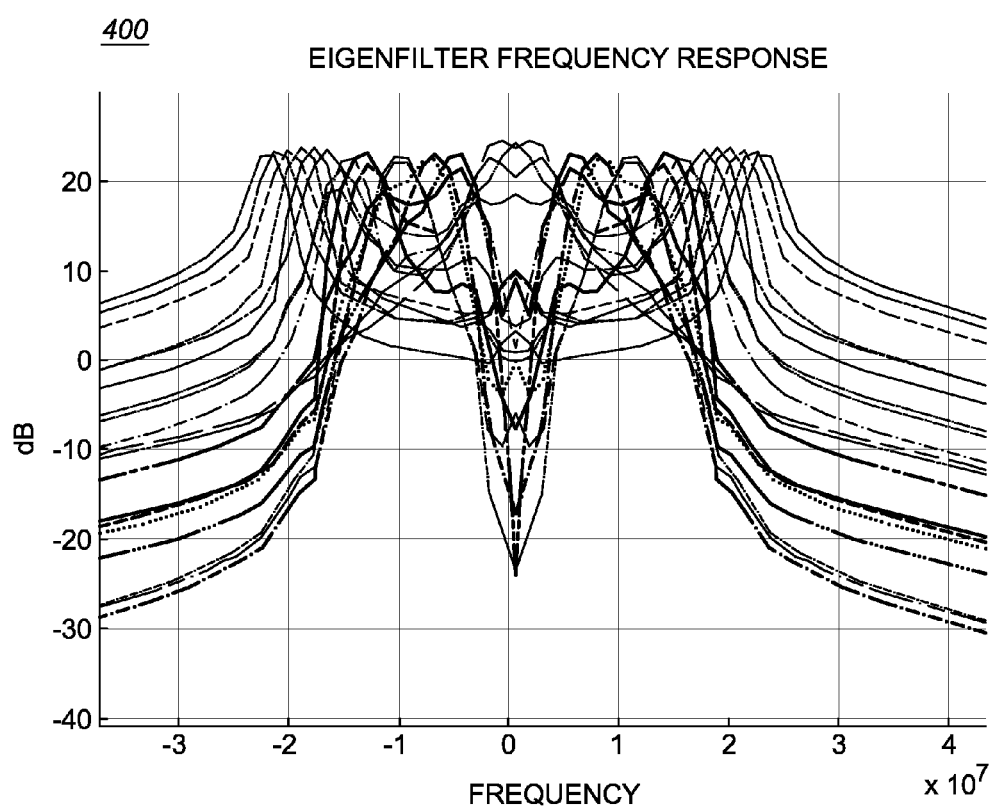
FIG. 4 shows a power spectral density of eigenfilters.

FIG. 4 shows a power spectral density 400 of the significant eigenfilters corresponding to the significant eigenvectors that span the signal chirp signal space. As shown in FIG. 4, the eigenfilters act as narrow band pass filters around certain frequencies of interest and they are orthogonal to each other.

Figure 5:
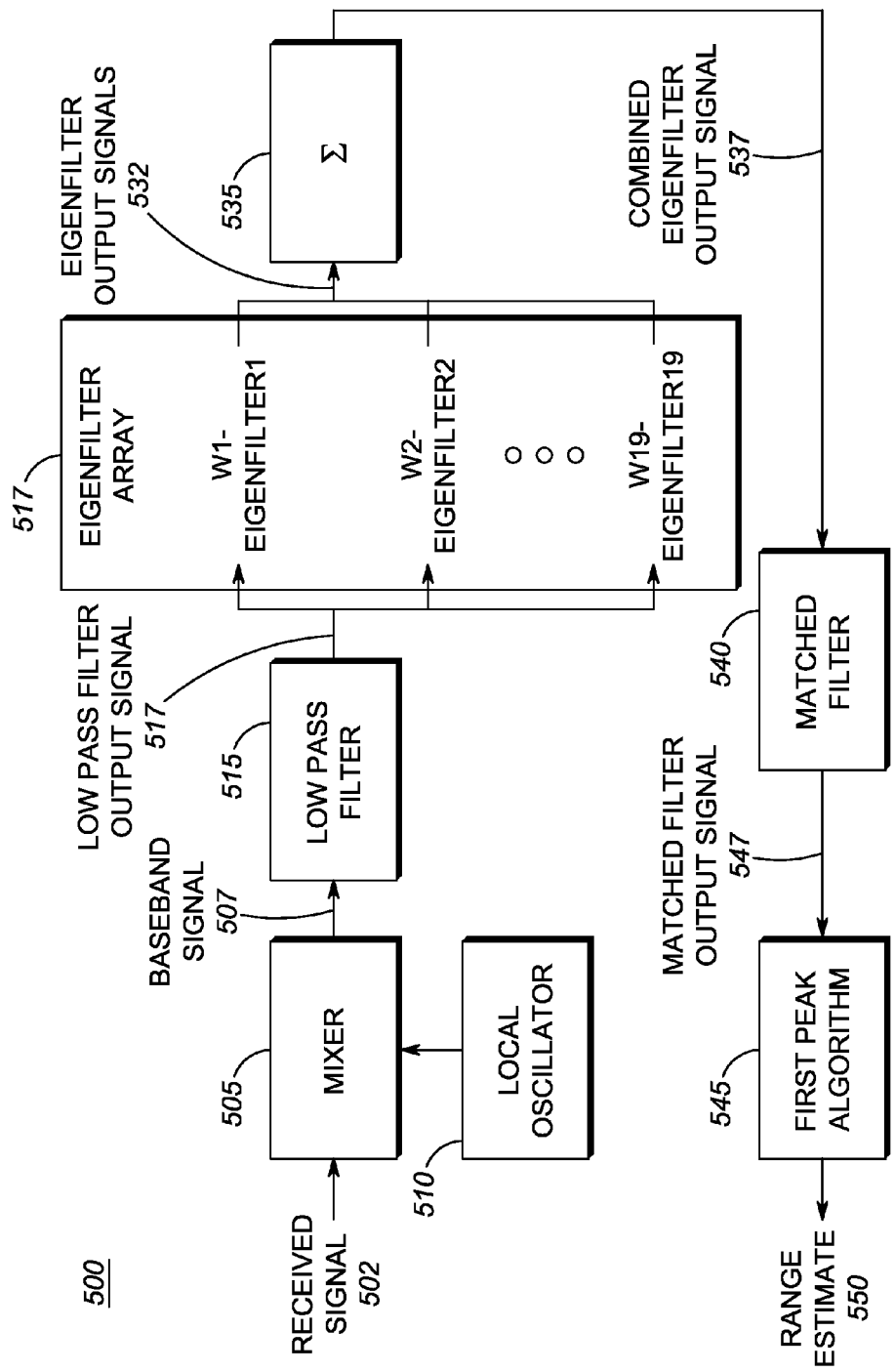
FIG. 5 is a functional block diagram of an example Subspace Matched Filter Detector (SMFD)

FIG. 5 is a functional block diagram of an example Subspace Matched Filter Detector (SMFD) 500 that may be used in estimating a multipath characteristic for use in configuring a multipath receiver, or in determining a range between a transmitter carried by emergency personnel and a receiver in urgent public safety situations. The transmitter and receiver may be coupled by a wireless communication air interface link. A received signal 502 that includes one or more distorted versions of a wideband (e.g., 50 MHz) predetermined waveform received over the wireless channel from the transmitter as well as noise due to the wireless link is captured by the SMFD 500. Further, the received signal 502 is down converted by mixer 505 with a signal from a local oscillator 510 to a baseband signal 507. Such a baseband signal is filtered by a low pass filter (LPF) 515 to remove out of band signals and interferers. One of skill in the art will recognize that other receiver architectures may be used to recover the baseband signal, including intermediate frequency conversion and sampling followed by a digital down conversion to a baseband frequency, as one example. The LPF output signal may be sampled and is sent to each of an array of eigenfilters 517. Further, each eigenfilter 517 may be a digital filter that acts as a narrow band pass filter. Although the eigenfilters 517 are shown to be an array of digital filters, a subset of the eigenfilters 517 may be combined into a single equivalent digital filter.

Determining the number of eigenfilters in the eigenfilter array may be done heuristically, such as by using a threshold value. The number of eigenfilters in the array may depend on characteristics of the predetermined waveform or chirp signal (e.g., chirp signal bandwidth, SMFD 500 sampling rate, and the duration of the chirp signal) as well as the significant eigenvalues of an estimated covariance matrix of the predetermined waveform determined through eigendecomposition of the predetermined waveform or chirp signal. In the example SMFD 500 shown in FIG. 5, the highest 19 eigenvalues were determined to be significant based on a simple threshold relative to an average of the lower-valued eigenvalues, and thus, the 19 corresponding eigenfilters comprise the eigenfilter array 517. Each of eigenfilter output signals 532 is weighted by a weighting coefficient and then the eigenfilter output signals 532 are combined (e.g., summed) 535. The weighting coefficients may be determined by the first elements of the eigenvectors of the covariance matrix. The combined eigenfilter output signal 537 is then passed through a matched filter 540.

The matched filter 540 is determined by pre-processing the predetermined waveform or chirp signal using the same array of eigenfilters 517. That is, for example, if the estimated covariance matrix of the predetermined waveform is a 2000× 2000 matrix (full length of the sampled predetermined waveform may be 10,000 samples), then the matched filter 540 is a (tap) length of 11,999 samples. Further, the matched filter may be a time-reverse of the sampled signal representing the predetermined waveform (e.g., chirp signal) filtered by the array of eigenfilters 517 (not a time-reverse of the predetermined waveform). The matched filter output signal 547 is then processed by one more peak detectors 545 that implement peak detection algorithms, to locate a plurality of peaks, or peaks above a given threshold, for use by a multipath receiver, or to locate the first peak that is then used in determining a ranging estimate 550.

Signals shown and described in FIG. 5 may be sampled by analog-to-digital converters. Further, the eigenfilters 517 shown in FIG. 5 may be combined into a single filter. In addition, the eigenfilters 517 and the matched filter 540 may be digital filter modules implemented by one or more processors, FPGAs, ASICs and the like.

Figure 6:
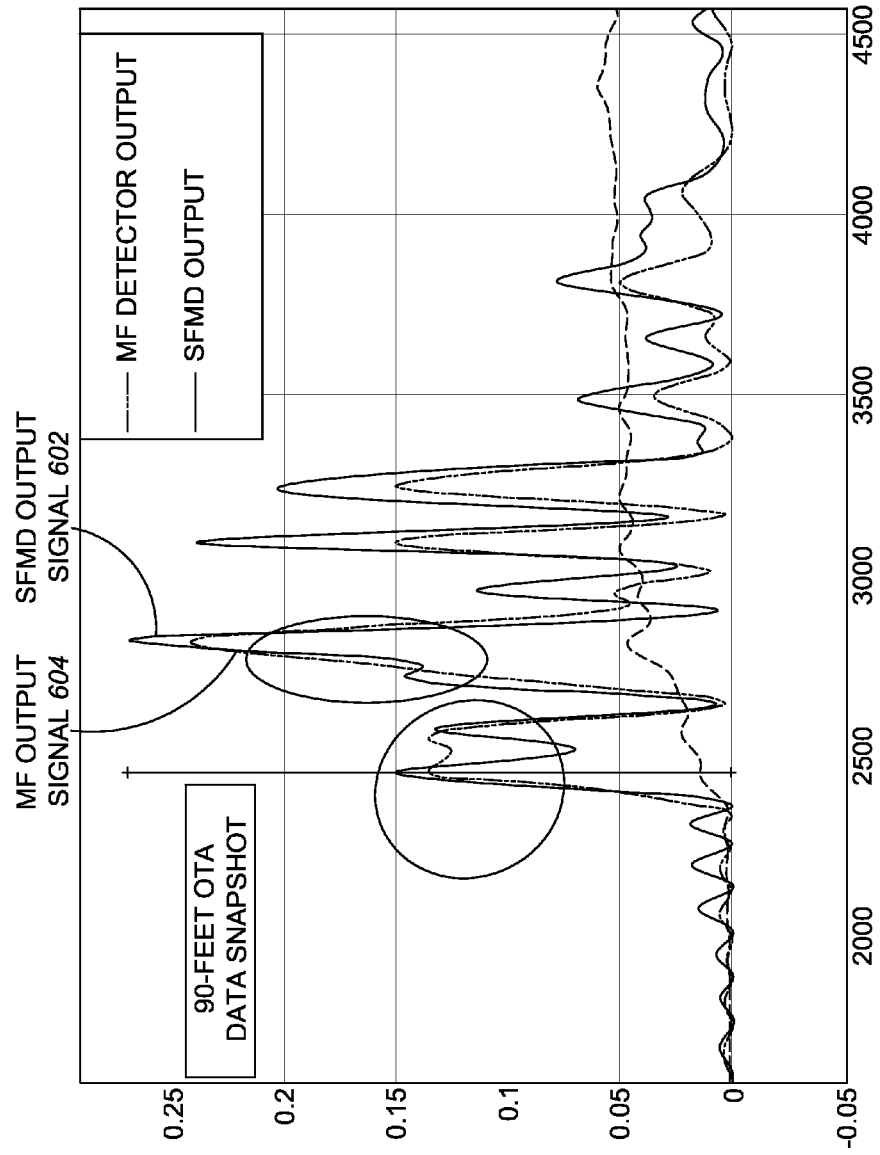
FIGS. 6 and 7 show and compare a SMFD output signal with a conventional matched filter output signal.
Figure 7:
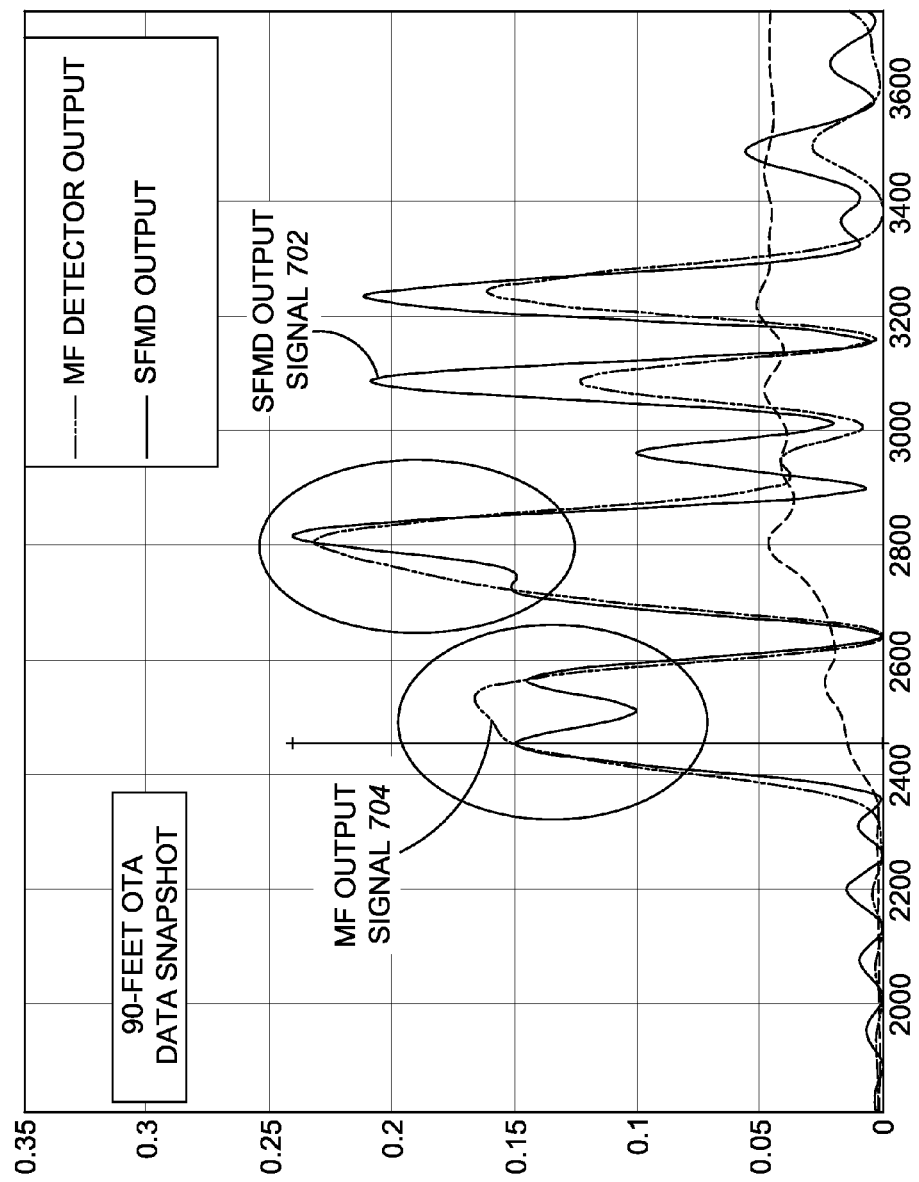

FIG. 6 and FIG. 7 show and compare an SMFD output signal with a conventional matched filter output signal for test samples taken (50 MHz chirp, 3.3 usec duration) with both the transmitter and receiver located in the interior of a building and separated by 90 feet. Referring to FIG. 6, the SMFD output signal 602 resolves peaks due to multipath better than conventional matched filter output signal 604. As indicated by the circled areas on FIG. 6, the resolution of the first path (which corresponds to the minimum delay path used in determining the range estimate) by the SMFD is better compared to the conventional matched filter output signal.

FIG. 7 shows and compares an SMFD output signal 702 with a conventional matched filter output signal 704, similar to those shown in FIG. 6. Further, FIG. 7 shows the conventional matched filter output signal 704 fails to peak at the minimum delay path whereas the SMFD output signal 702 produced an easily detectable peak. Note that even though the bandwidth of the chirp signal is the same in both receivers, the SMFD receiver is able to resolve the peaks better than a conventional matched filter based receiver if the predetermined waveform or chirp signal has a wider chirp bandwidth.

Figure 8:
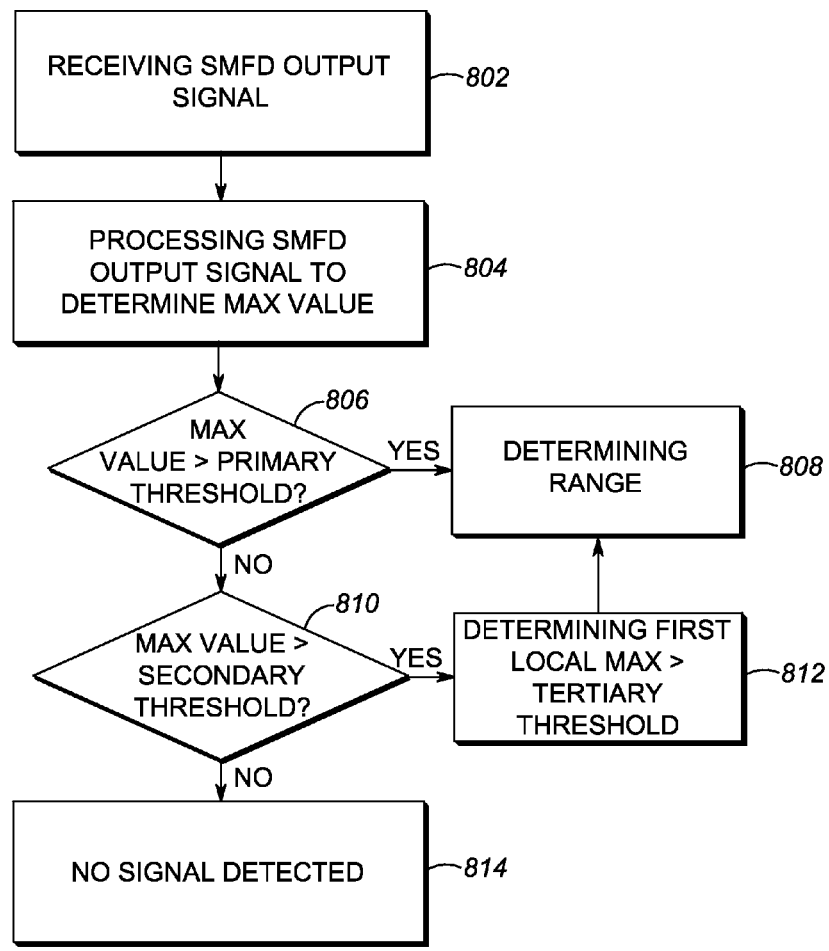
FIG. 8 is an example flowchart of an example method to detect a first peak of a SMFD output signal.

FIG. 8 is an example flowchart of an example method 800 to detect a first peak of a SMFD output signal. Detecting the first peak and determining the corresponding time index value can be used to estimate the range between a transmitter and a receiver in a communication system. The example method 800 may include receiving a SMFD output signal, as shown in block 802. Further, the example method 800 may include computing a global maximum output value and the corresponding time index of the SMFD output signal, as shown in block 804. In addition, the example method 800 may determine whether the global maximum output value exceeds a primary threshold, as shown in block 806. If so, the estimated range between transmitter and receiver is based on a corresponding time index, the sample at which time index the SMFD output is maximum (peaked). For example, if the maximum output value exceeds a preset high threshold of 0.6, then the time index corresponding to the maximum output value is used determine the range between transmitter and receiver. In certain embodiments, if the maximum output value exceeds a primary threshold, then a received signal captured by the SMFD is received from a Line of Sight (LOS) path from a corresponding transmitter.

However, if the global maximum output value does not cross the primary threshold (e.g., 0.6), then the example method 800 includes checking if the global maximum output value exceeds a secondary threshold (e.g., 0.1), as shown in block 810. If not, the example method 800 determines that a predetermined waveform or a chirp signal was not detected, as shown in block 814. However, if a global maximum output value exceeds the secondary threshold (e.g., 0.1), the example method 800 searches for potential peaks of smaller amplitudes (local maxima) within a window of samples chosen prior to the global maximum output value and determines the time index of a first local maximum that exceeds a tertiary threshold (e.g., 0.1), as shown in block 812. For example, a sample size for the SMFD output signal may be 2000 samples. Each sample corresponds to a time index. If the global output maximum value that exceeds the secondary threshold is located at sample number 347 with a global output maximum value of 0.23, then the example method 800 may choose a window of 50 samples before sample number 347. Thereafter, the example method 800 determines a sample number within the window where a first local maximum exceeds the tertiary threshold. For example, sample number 331 may have an output value equal to 0.17. Thus, the time index corresponding to sample number 331 is used to determine the range between the transmitter and receiver.

Figure 9:
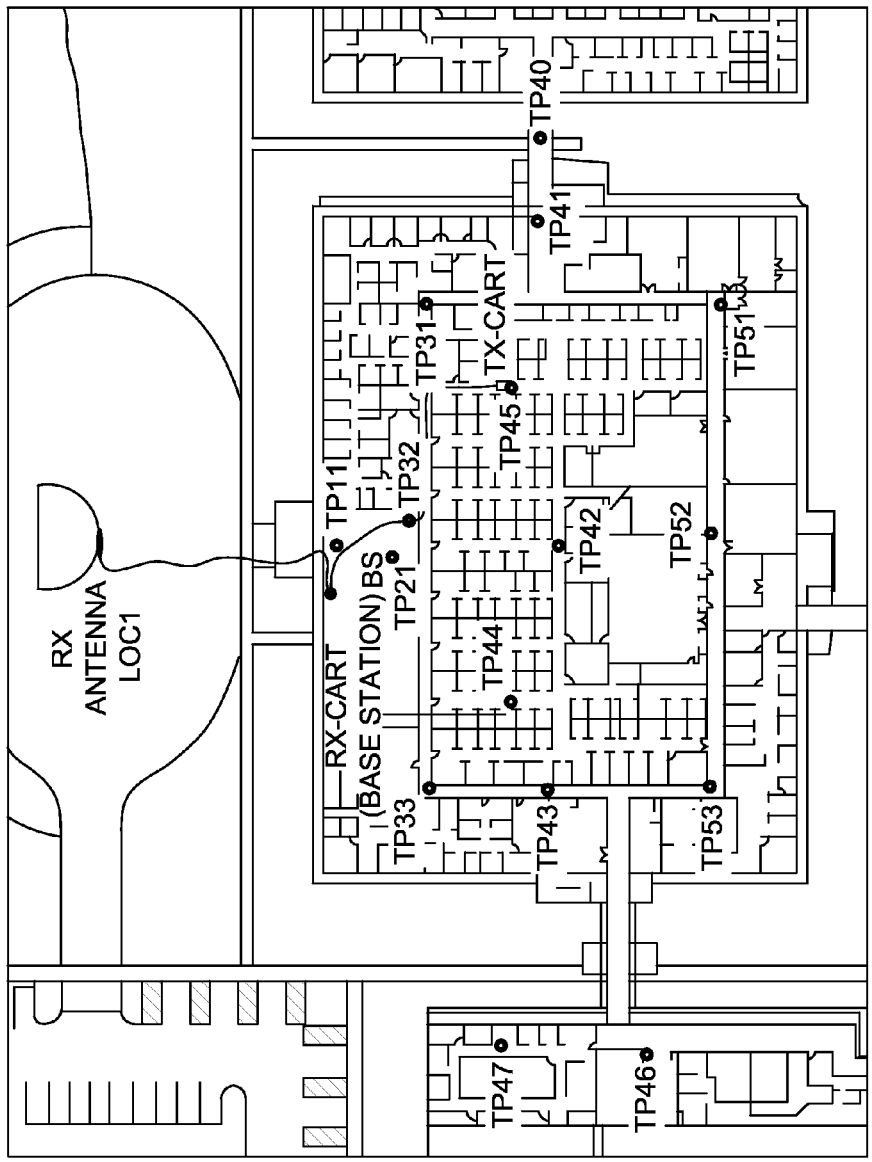
FIG. 9 is an example network of a transmitter and a receiver using a SMFD.

FIG. 9 is an example network 900 of transmitters and a receiver using a SMFD. Each transmitter emits a predetermined waveform that is a wideband 50 MHz chirp signal. The example network may be considered an Over the Air (OTA) environment with receiver antenna kept outside a building and the transmitters located at various indoor test points. Other network parameters may include a center frequency of operation located at 475 MHz and transmit power limited to about +33 dBm. The transmitters are positioned at several locations inside the building as shown by the test points (TPxx) in FIG. 9. Further, the SMFD is configured with 19 eigenfilters. The average ranging errors are shown in Table 1. Using the SMFD, the average error is less than 16 feet over distances up to 200 feet. Average error indicates the ranging error over 100 chirp measurements at each location.

TABLE 1

| Location | Approx Distance (ft) | Average Error with MFD (ft) | Average Error with SMFD (ft) |
|---|---|---|---|
| TP11 | 100 | 25 | 1 |
| TP32 | 133 | 28 | 14 |
| TP31 | 170 | 29 | 6 |
| TP33 | 172 | 20 | 10 |
| TP45 | 184 | 28 | 16 |
| TP44 | 185 | 60 | 10 |
| TP42 | 193 | 30 | 11 |

In another embodiment, a range between a transmitter and receiver is determined when a predetermined waveform is a 6 MHz (narrowband) chirp signal with a chirp duration of 3 microseconds. As mentioned in the present disclosure, a predetermined waveform or chirp signal having a wide bandwidth may be required to resolve the multiple peaks in the matched filter output due to multipath fading. However increasing bandwidth causes increased noise as well as interference thereby reducing the range estimation between the transmitter and receiver. Further, wideband signals may require more power as well as bandwidth, each of which may not be available in certain wireless networks.

Figure 10:
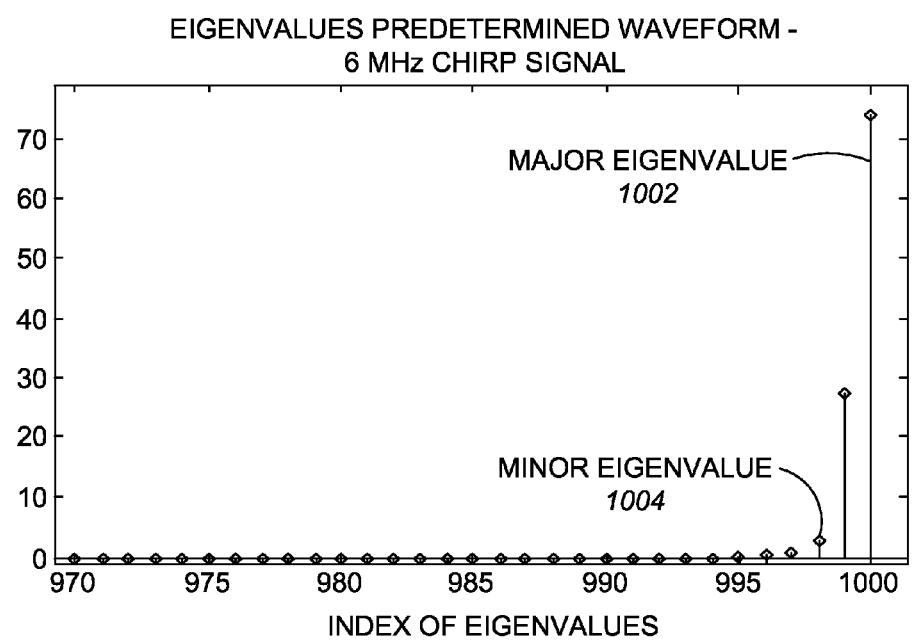
FIG. 10 shows the eigenvalues of the predetermined narrowband waveform.

Thus, in an embodiment using a narrowband 6 MHz chirp signal, a covariance matrix of dimension 1000 may be computed on such a chirp signal to determine the covariance matrix eigenvalues and corresponding eigenvectors. The eigenvalues of the covariance matrix of the predetermined waveform or chirp signal is shown in FIG. 10. Analyzing the 1000 eigenvalues and corresponding eigenvectors, a major eigenvector corresponding to the maximum eigenvalue is determined. A minor eigenvector is determined such that it is corresponds to the eigenvalue that is minimally above a threshold. For the eigenvalues of the predetermined waveform of a 6 MHz chirp signal as shown in FIG. 10, the major eigenvalue 1002, corresponding to the major eigenvector, and the minor eigenvalue 1004, corresponding to the minor eigenvector, correspond to the eigenvalue indices 1000 and 998, respectively. Further, a major eigenfilter and a minor eigenfilter may be determined based on the major eigenvector and minor eigenvector, respectively.

Figure 11:
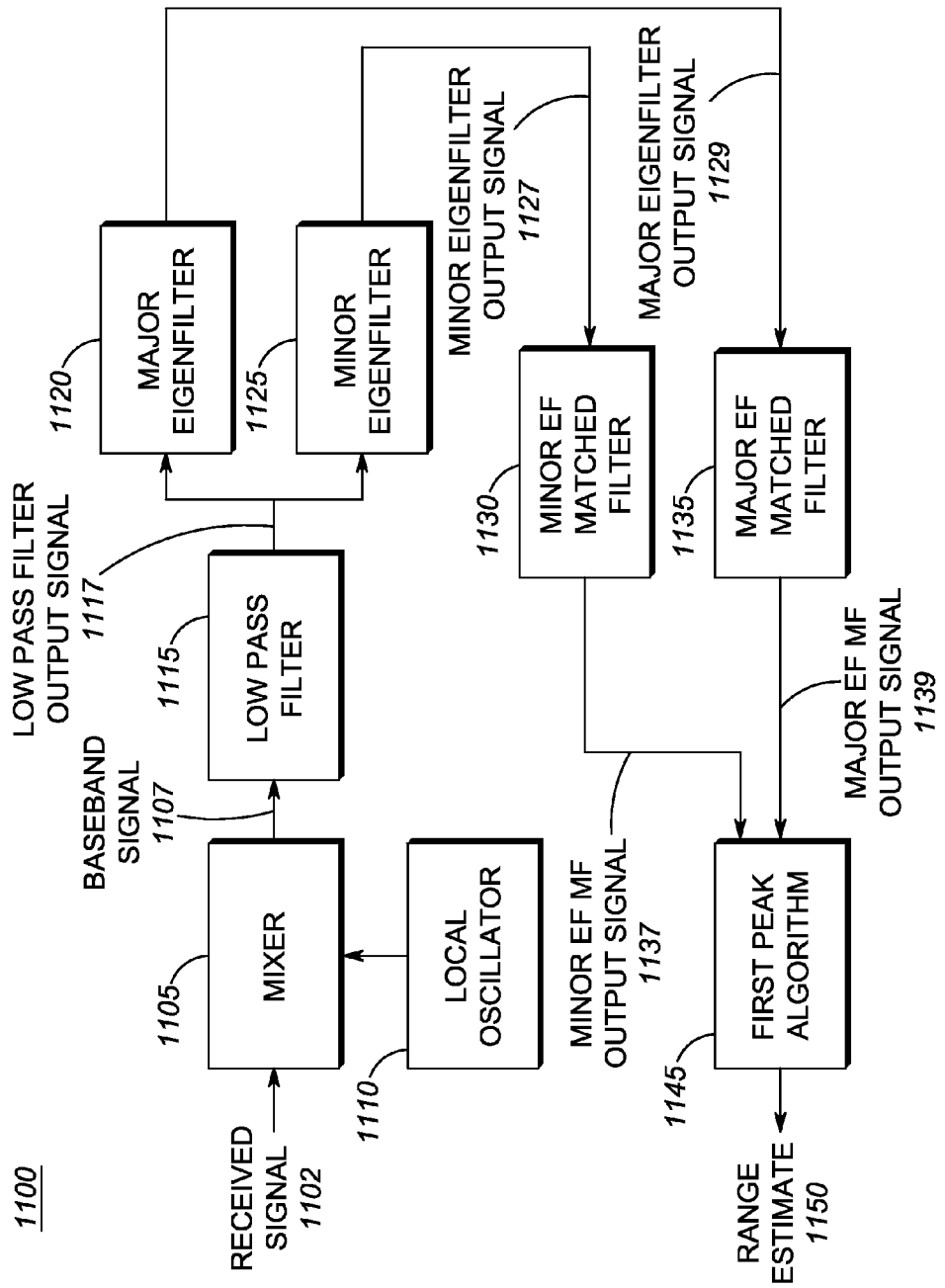
FIG. 11 is a functional block diagram of an example Minor Component Matched Filter Detector (MCMFD) used in a receiver.

FIG. 11 is a functional block diagram of an example Minor Component Matched Filter Detector (MCMFD) 1100 used in a receiver for estimating a range between a transmitter and a receiver. The transmitter emits a narrowband predetermined waveform such as a 6 MHz chirp signal. A received signal 1102 is captured by the MCMFD 1100 and provided to a mixer 1105. Further, a local oscillator 1110 provides a local oscillator signal such that the received signal 1102 is downmixed by to a baseband signal 1107. In addition, a low pass filter 1115 removes out of band signals and interferers to produce a low pass filter output signal 1117. The low pass filter output signal may be sampled is then processed by a major eigenfilter (EF) 1120 and a minor eigenfilter (EF) 1125 to produce a major eigenfilter output signal 1129 and a minor eigenfilter output signal 1127, respectively. Both of the major eigenfilter and minor eigenfilter are determined from eigendecomposition of the covariance matrix of the predetermined waveform, 6 MHz chirp signal.

A major EF matched filter 1135 is determined based on the time-reverse of the sampled predetermined waveform (e.g., 6 MHz chirp signal) filtered by the major eigenfilter. Further, a minor EF matched filter 1130 is determined based on the time-reverse of the sampled predetermined waveform (e.g., 6 MHz chirp signal) filtered by the minor eigenfilter. Thus, the minor EF matched filter 1130 receives and filters the minor eigenfilter output signal 1127 and provides a minor EF matched filter (MF) output signal 1137. In addition, the major EF matched filter 1135 receives and filters the major eigenfilter output signal 1129 and provides a major EF matched filter (MF) output signal 1139.

Both matched filter output signals (1137 and 1139) are analyzed by a peak detector 1145 that implements a first peak detection algorithm to determine a first peak of the received signal 1102. Such a first peak detection algorithm may be implemented by one or more computer processors. Further, the first peak detection algorithm may include choosing a window of samples based on a global maximum of the major EF MF output signal 1139. Within this window of samples, a first local maxima of the minor EF MF output signal that exceeds a preset threshold is determined. The range estimate 1150 between the transmitter and receiver can be determined by the time index of such a local maximum.

Signals shown and described in FIG. 11 may be sampled by analog-to-digital converters. Further, the eigenfilters (1120 and 1125) shown in FIG. 11 may be combined into a single filter. In addition, the eigenfilters (1120 and 1125) and the matched filters (1130 and 1135) may be digital filters implemented by one or more processors.

Figure 12:
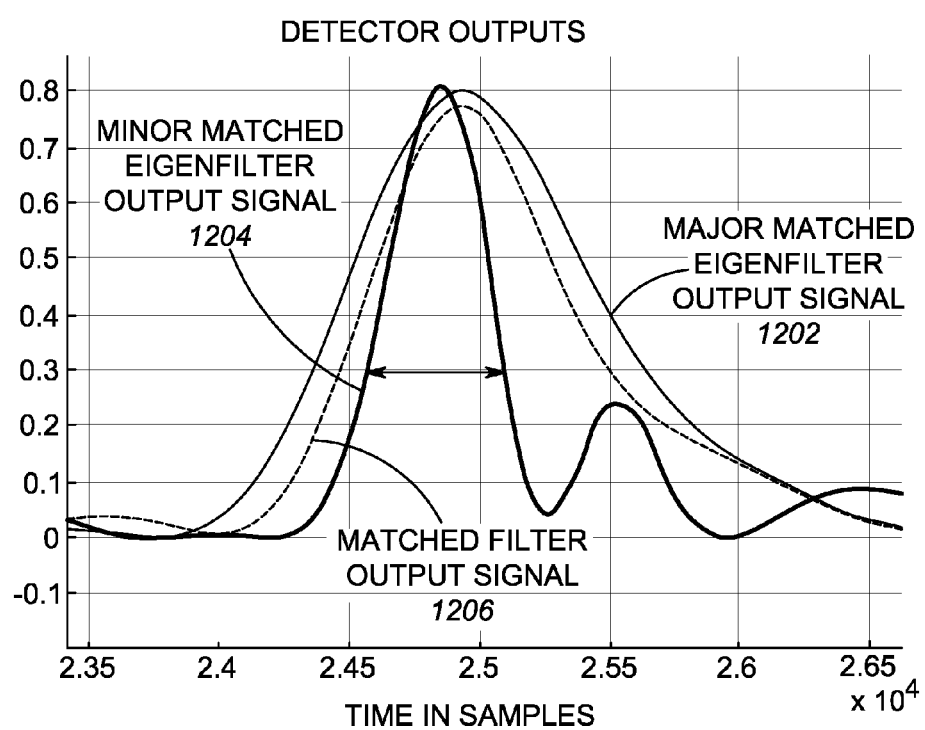
FIG. 12 shows and compares the output signal of a matched major eigenfilter output signal, a matched minor eigenfilter output signal, and a conventional matched filter output signal.

FIG. 12 shows and compares a major EF MF output signal 1202 and a minor EF MF output signal 1204 with a conventional matched filter (MF) output signal 1206. The major EF MF output signal 1202 shows the widest peak between the three output signals and a second peak due to multipath interference is not resolved. The conventional MF output signal produces a slightly sharper peak than the major EF MF output signal 1202, but cannot resolve the second peak that is present as a result of multipath. The minor EF MF output signal produces the sharpest peak and is able to resolve the second peak caused by multipath.

Further, the first peak algorithm discussed when describing FIG. 11, identifies the global maximum value of the major EF MF output signal 1202. A window of samples is chosen around the global maximum value of the major EF MF output signal. Further, the minor EF MF output signal is processed to determine the sample (and corresponding time index) of a first local maximum within the window of samples. The time index corresponding to the first local maximum is used to determine the range between the transmitter and receiver.

Figure 13:
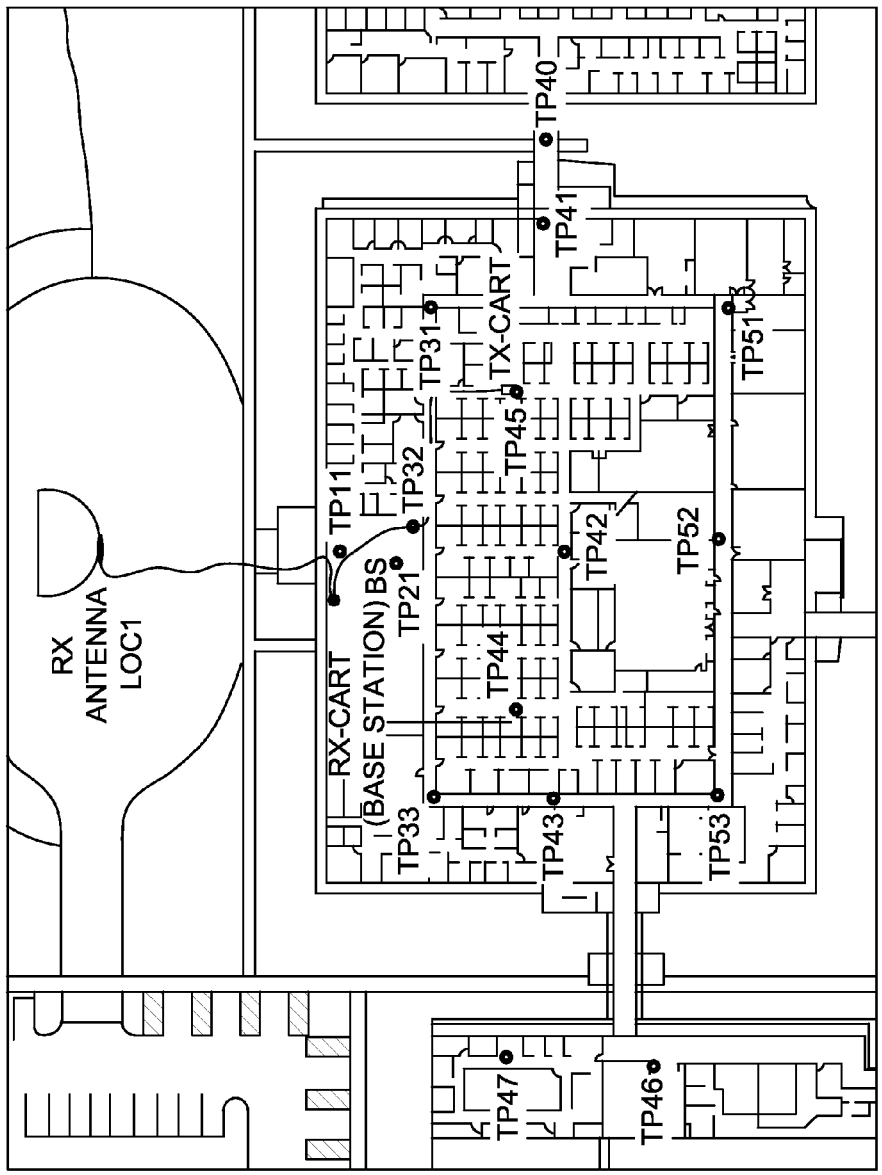
FIG. 13 is an example network of a transmitter and a receiver using a MCMFD.

FIG. 13 is an example network 1300 of transmitters and a receiver using a MCMFD. The example network 1300 is an Over the Air (OTA) environment with receiver antenna kept outside a building and the transmitters are located at various indoor test points as show in FIG. 13 (TPxx). The parameters of the predetermined waveform or chirp signal emitted by the transmitters include a 6 MHz, 9.4 usec long predetermined waveform chirp signal transmitted within a UHF band 424 MHz-430 MHz. Further, the transmit power is limited to +33 dBm. The average ranging errors are shown in Table 2.

TABLE 2

| Location | Approximate Distance (ft) | Average Error with MFD (ft) | Average Error with MCMFD (ft) |
|---|---|---|---|
| TP32 | 133 | 5 | 2 |
| TP31 | 170 | 115 | 17 |
| TP33 | 172 | 40 | 40 |
| TP42 | 193 | 81 | 34 |
| TP43 | 215 | 150 | 65 |
| TP52 | 259 | 21 | 8 |

TABLE 2-continued

| Location | Approximate Distance (ft) | Average Error with MFD (ft) | Average Error with MCMFD (ft) |
|---|---|---|---|
| TP53 | 275 | 110 | 7 |
| TP51 | 280 | 170 | 72 |
| TP46 | 307 | 80 | 6 |

The MCMFD receiver substantially outperformed a conventional match filter based receiver at all locations. The range estimate using a narrowband 6 MHz chirp signal was determined using a single receiver. Range estimates can be improved in such an example network shown in FIG. 13 by having multiple receivers and exploiting diversity.

Figure 14:
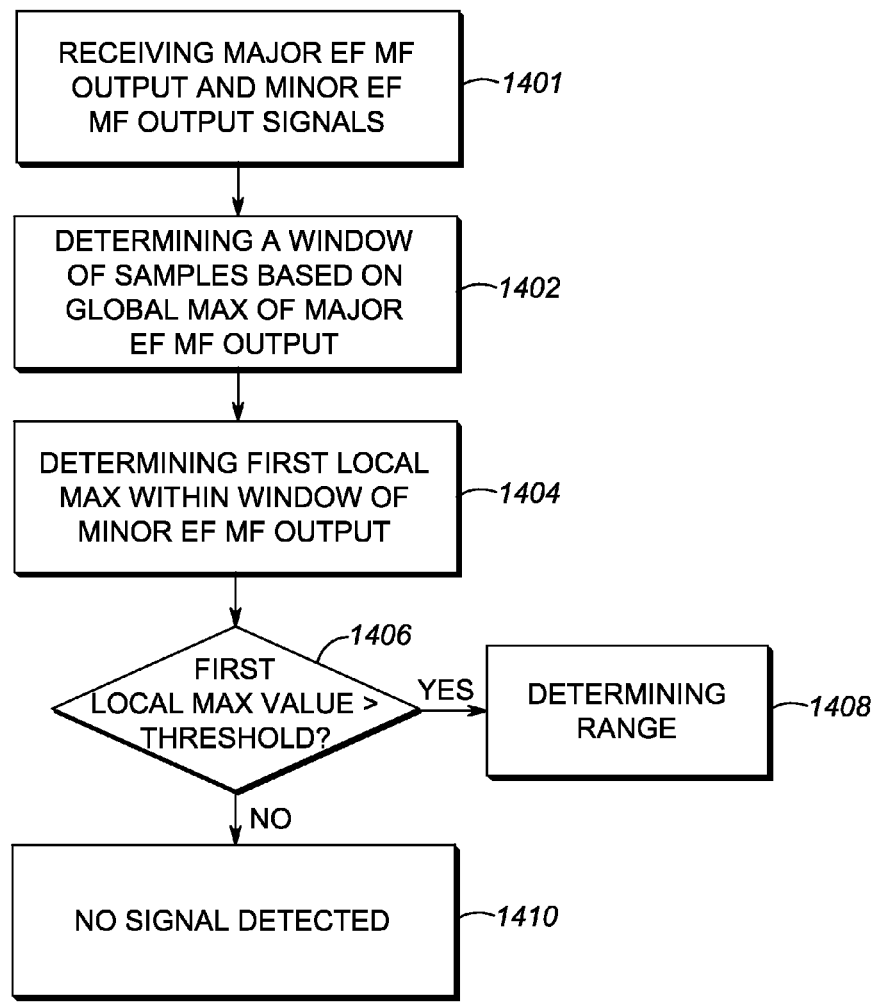
FIG. 14 is an example flowchart of an example method 1400 to detect a first peak of a MCMFD output signal.

FIG. 14 is an example flowchart of an example method 1400 of determining a range between a transmitter and a receiver. The example method may use a narrowband predetermined waveform (e.g., 6 MHz) chirp signal and the receiver may use a MCMFD. Such a MCMFD includes a major eigenfilter (EF) matched filter (MF) and a minor eigenfilter (EF) matched filter (MF). The example method 1400 may include receiving a major EF MF output signal and a minor EF MF output signal, as shown in block 1401. The example method 1400 may further include determining a window of samples based on a global maximum value of the major EF MF output signal, as shown in block 1402. In addition, the example method 1400 may include determining a first local maximum value with the window of samples of the minor EF MF output signal, as shown in block 1404. Moreover, the example method 1400 may include determining whether the first local maximum value is above a threshold, as shown in block 1406. For example, the threshold may be 0.1. If the first local maximum value is above the threshold, the example method 1400 determines the range between the transmitter and receiver based on the time index corresponding to the first local maximum, as shown in block 1408. If the first local maximum value is not above the threshold (e.g., 0.1), then it is determined that no signal has been detected by the MCMFD, as shown in block 1410.

Figure 15:
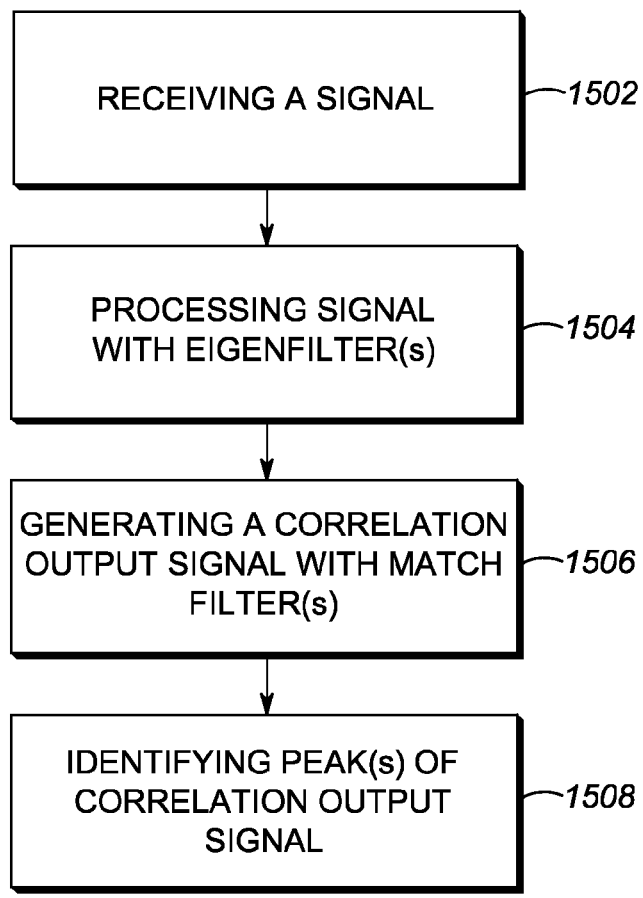
FIG. 15 is an example flowchart of an example method that identifies a peak of a correlation output signal of a receiver.

FIG. 15 is an example flowchart of an example method 1500 that identifies a peak of a correlation output signal of a receiver. Such an example method 1500 may be used to determine the range between a transmitter emitting a predetermined waveform such as chirp signal and the receiver. The example method 1500 may include receiving a signal over a wireless network, the received signal including one or more distorted versions of a predetermined waveform, as shown in block 1502. The distortion may be based on noise as well as multipath fading caused by the signal traversing the wireless network. Further, the example method 1500 may include processing the received signal with a plurality of eigenfilters generated from eigenvectors of a covariance matrix of the predetermined waveform, as shown in block 1504. The covariance matrix may be an estimate of the covariance matrix. That is, a sampled predetermined waveform may include 11,999 samples. However, an estimate of the covariance matrix of such a sampled predetermined waveform signal may include determining the covariance matrix of the first 2000 time offsets of the autocorrelation.

In addition, the example method 1500 may include generating a correlation output by further processing the received signal with at least one matched filter formed from an eigenfiltered version of the predetermined waveform, as shown in block 1506. That is, the at least one matched filter can be the time-reverse of the sampled predetermined waveform filtered by the plurality of eigenfilters. Moreover, the example method 1500 may include identifying at least one peak in the correlator output, as shown in block 1508. The identifying the at least one peak may be performed by an algorithm implemented by a processor.

Other embodiments of the present disclosure may determine a multipath characteristic based on the at least one peak such that the multipath characteristic includes a magnitude and delay for each peak of the at least one peak. Further, some embodiments include using, configuring, or providing the multipath characteristic to a multipath receiver. A set of predetermined waveforms may be a set of chirp signals, a set of spread spectrum signals, and a set of orthogonal signals, among other possible variations.

Figure 16:
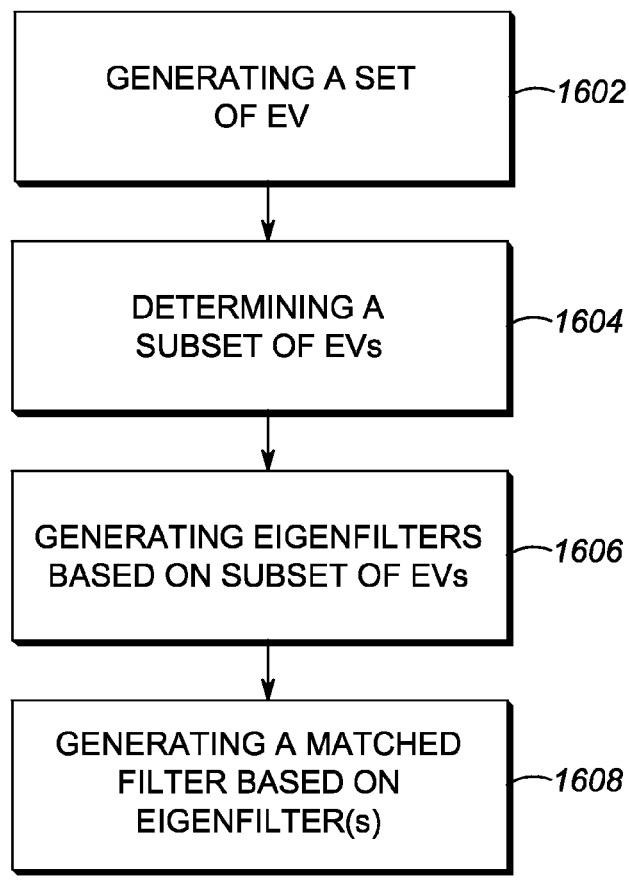
FIG. 16 is an example flowchart of an example method that can be used to generate one or more eigenfilters and one or more matched filters based on the eigenfilters.

FIG. 16 is an example flowchart of an example method 1600 that generates one or more eigenfilters and one or more matched filters based on the eigenfilters. The example method 1600 may include generating a set of eigenvectors based on the covariance matrix of the predetermined waveform, as shown in block 1602. That is, a predetermined waveform may be sampled such that the sampled predetermined waveform includes 10,000 samples. A covariance matrix may be determined using all 10,000 samples and all time shifts in the autocorrelation. However, other embodiments may estimate the covariance matrix of the sampled predetermined waveform by finding the covariance matrix of the first 2000 shifts of the samples predetermined waveform.

Further, the example method 1600 may include determining a subset of eigenvectors for the covariance (or estimated covariance matrix) such that each eigenvector of the subset of eigenvectors has a corresponding eigenvalue above a threshold, as shown in block 1604. That is, the eigenvalues determined from the covariance matrix may be significant to the predetermine waveform or may be the noisy perturbations in the predetermined waveform that are considered insignificant to the predetermined waveform. The significant and insignificant eigenvalues are separated by a threshold. In addition, the example method 1600 may include generating the plurality of eigenfilters based on the subset of eigenvectors, as shown in block 1606. The subset of eigenvectors are the eigenvectors corresponding to the significant eigenvalues. Moreover, the example method 1600 may include generating at least one matched filter by processing the predetermined waveform by at least one of the plurality of eigenfilters, as shown in block 1608. That is, the at least one matched filter is the time-reverse of the sampled predetermined waveform filtered by the plurality of eigenfilters.

In one embodiment, the plurality of eigenfilters includes a major eigenfilter and a minor eigenfilter. Further, a major eigenfilter (EF) matched filter (MF) may be formed from filtering the sampled predetermined waveform by the major eigenfilter and a minor eigenfilter (EF) matched filter (MF) may be formed from filtering the sampled predetermined waveform by the minor eigenfilter.

Further embodiments may include an apparatus such as those depicted in FIGS. 5 and 11, and may comprise a plurality of eigenfilters generated from eigenvectors of a covariance matrix of a predetermined waveform configured to filter a received a signal including one or more distorted versions of the predetermined waveform; a matched filter formed from a eigenfiltered version of the predetermined waveform, configured to generate a correlation output signal by further processing the received signal; and, a peak detector configured to identify at least one peak in the correlation output signal. The plurality of eigenfilters of the apparatus are based on eigenvectors of a covariance matrix of the predetermined signal. In various embodiments they may be either (i) a major eigenfilter and a minor eigenfilter or (ii) a set of eigenfilters formed from a subset of significant eigenvectors, such as those eigenvectors having a corresponding eigenvalue above a threshold.

A further embodiment may include determining whether to implement a SMFD or a MCMFD within a receiver based on a wireless network environment (indoor, outdoor, open area, densely populated with buildings, etc.) and the available spectrum/bandwidth to send a signal from one or more transmitters to the receiver as well as the coverage area of which location tracking is desired. For example, in a fire rescue public safety situation, the available bandwidth for transmitter (e.g. location) signals can be determined from a geo-location database. Such a determination prevents ranging applications to interfere with voice communication between firefighters and support personnel. Once the bandwidth availability is determined and the type of chirp signal is selected (e.g. narrowband or wideband) then a SMFD or MCMFD receiver is implemented in the wireless network. In addition, if the coverage area is inside a small building then wider bandwidth location signals can be employed. Otherwise, if the coverage area is large, then narrower bandwidth location signals can be employed.

The foregoing is illustrative only and is not intended to be in any way limiting. Reference is made to the accompanying drawings, which form a part hereof. In the drawings, similar symbols typically identify similar components, unless context dictates otherwise.

Note that the functional blocks, methods, devices and systems described in the present disclosure may be integrated or divided into different combination of systems, devices, and functional blocks as would be known to those skilled in the art.

In general, it should be understood that the circuits described herein may be implemented in hardware using integrated circuit development technologies, or yet via some other methods, or the combination of hardware and software objects that could be ordered, parameterized, and connected in a software environment to implement different functions described herein. For example, the present application may be implemented using a general purpose or dedicated processor running a software application through volatile or non-volatile memory. Also, the hardware objects could communicate using electrical signals, with states of the signals representing different data.

It should be further understood that this and other arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions, or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or, "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed:

1. A method comprising:
    receiving a signal including one or more distorted versions of a predetermined waveform;
    processing the received signal with a plurality of eigenfilters generated from eigenvectors of a covariance matrix of the predetermined waveform;
    generating a correlation output by further processing the received signal with at least one matched filter formed from a eigenfiltered version of the predetermined waveform; and
    identifying at least one peak in the correlator output.

2. The method of claim 1, wherein the covariance matrix is an estimate of the covariance matrix based on the predetermined waveform.

3. The method of claim 1 further comprising generating each matched filter by processing the predetermined waveform by at least one of the plurality of eigenfilters.

4. The method of claim 1, wherein the plurality of eigenfilters includes a major eigenfilter and a minor eigenfilter.

5. The method of claim 4, wherein the at least one matched filter includes:
    a major eigenvector matched filter formed from filtering the predetermined waveform by the major eigenfilter; and
    a minor eigenvector matched filter formed from filtering the predetermined waveform by the minor eigenfilter; and,
    wherein further processing the received signal comprises match-filtering an output of the major eigenfilter with the major eigenvector matched filter and match-filtering an output of the minor eigenfilter with the minor eigenvector matched filter.

6. The method of claim 5, further comprising:
    selecting a window of time indices based on a global maximum of a major eigenvector matched filter output;
    determining a first local maxima within the window of time indices of a minor eigenvector matched filter output that exceeds a threshold;
    wherein the at least one peak includes first local maxima of the minor eigenvector matched filter output.

7. The method of claim 1, wherein the one or more distorted versions of the predetermined waveform are from a multipath transmission.

8. The method of claim 1, further comprising:
    generating a set of eigenvectors based on the covariance matrix of the predetermined waveform;
    determining a subset of eigenvectors wherein each eigenvector of the subset of eigenvectors has a corresponding eigenvalue above a threshold;
    generating the plurality of eigenfilters based on the subset of eigenvectors.

9. The method of claim 8, wherein the plurality of eigenfilters are combined into a single composite eigenfilter.

10. The method of claim 1, further comprising determining a range to a source of the received signal based on the at least one peak.

11. The method of claim 1, further comprising determining a multipath characteristic based on the at least one peak wherein the multipath characteristic includes a magnitude and delay for each peak of the at least one peak.

12. The method of claim 10, further comprising providing the multipath characteristic to a multipath receiver.

13. The method of claim 1, wherein the predetermined waveform is selected from a set of communication signals consisting of chirp signals, spread spectrum signals, and orthogonal signals.

14. A method comprising:
    detecting an available bandwidth in a wireless network to transmit one or more transmitter signals to a receiver;
    selecting a predetermined waveform for the one or more transmitter signals based on the available bandwidth of the wireless network;
    configuring the receiver to have a plurality of eigenfilters based on predetermined waveform.

15. The method of claim 14, further comprising configuring at least one matched filter based on the plurality of eigenfilters wherein an output signal of the at least one match filter is processed to identify at least one peak.

16. The method of claim 14, further comprising:
    generating a set of eigenvectors based on the covariance matrix of the predetermined waveform;
    determining a subset of eigenvectors wherein each eigenvector of the subset of eigenvectors has a corresponding eigenvalue above a threshold;
    generating the plurality of eigenfilters based on the subset of eigenvectors.

17. The method of claim 14, wherein the plurality of eigenfilters includes a major eigenfilter and a minor eigenfilter.

18. The method of claim 17, wherein the at least one matched filter includes:
    a major eigenvector matched filter formed from filtering the predetermined waveform by the major eigenfilter; and
    a minor eigenvector matched filter formed from filtering the predetermined waveform by the minor eigenfilter; and
    wherein further processing a received signal comprises match-filtering an output of the major eigenfilter with the major eigenvector matched filter and match-filtering an output of the minor eigenfilter with the minor eigenvector matched filter.

19. An apparatus comprising:
    a plurality of eigenfilters generated from eigenvectors of a covariance matrix of a predetermined waveform configured to filter a received a signal including one or more distorted versions of the predetermined waveform;

a matched filter formed from a eigenfiltered version of the predetermined waveform, configured to generate a correlation output signal by further processing the received signal; and, a peak detector configured to identify at least one peak in the correlation output signal.

20. The apparatus of claim 19, wherein the plurality of eigenfilters are based on eigenvectors of a covariance matrix of the predetermined signal and are selected from a group consisting of (i) a major eigenfilter and a minor eigenfilter and (ii) a set of eigenfilters formed from a subset of eigenvectors wherein each eigenvector of the subset of eigenvectors has a corresponding eigenvalue above a threshold.

* * * * *